United States Patent
Imai (10) Patent No.: US 9,036,311 B2
(45) Date of Patent: May 19, 2015

(54) MOTOR DRIVE CIRCUIT

(75) Inventor: Toshiyuki Imai, Oizumi-machi (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 492 days.

(21) Appl. No.: 13/183,640

(22) Filed: Jul. 15, 2011

(65) Prior Publication Data

US 2012/0182649 A1    Jul. 19, 2012

(30) Foreign Application Priority Data

Jul. 16, 2010   (JP) .................. 2010-161838

(51) Int. Cl.
*H02H 5/04* (2006.01)
*B60L 9/00* (2006.01)
*H02P 29/02* (2006.01)

(52) U.S. Cl.
CPC ............ *H02P 29/028* (2013.01); *H02P 29/021* (2013.01)

(58) Field of Classification Search
CPC ........... H02P 29/028; H02P 5/00; H02P 6/18; H02P 29/021; E05B 77/54; E05B 81/62; B60L 11/1807; Y02T 10/644; Y02T 10/7283
USPC ................. 361/1, 23; 340/648; 72/19.8, 13.1; 323/908
See application file for complete search history.

(56) References Cited

U.S. PATENT DOCUMENTS

| | | | | |
|---|---|---|---|---|
| 6,035,775 | A | * | 3/2000 | Nghiem ........................ 100/43 |
| 7,486,038 | B2 | * | 2/2009 | Amagasa ................. 318/400.21 |
| 2002/0116100 | A1 | * | 8/2002 | Shimazaki et al. ............ 701/22 |
| 2009/0200973 | A1 | * | 8/2009 | Uchiyama ............... 318/400.26 |

FOREIGN PATENT DOCUMENTS

| | | | | |
|---|---|---|---|---|
| JP | 2000-188893 | | 7/2000 | |
| JP | 2000188893 | * | 7/2000 | ............... H02P 6/18 |
| JP | 2005-269686 | | 9/2005 | |
| JP | 2005269686 | * | 9/2005 | ............... H02P 5/00 |

* cited by examiner

*Primary Examiner* — Bentsu Ro
*Assistant Examiner* — Zemenay Truneh
(74) *Attorney, Agent, or Firm* — Rennie William Dover (57) ABSTRACT

A motor drive circuit comprising: a drive circuit configured to supply a drive current to a drive coil of a motor; a control circuit configured to control an operation of the drive circuit; a locking protection circuit configured to control an operation of the control circuit so that the drive circuit stops supplying the drive current to the drive coil, if a rotation signal, indicating rotation of the motor, is not generated during a predetermined time period although the drive circuit is supplying the drive current to the drive coil; and a prohibition circuit configured to prohibit the locking protection circuit from controlling the control circuit.

18 Claims, 6 Drawing Sheets

MOTOR DRIVE CIRCUIT

CROSS-REFERENCE TO RELATED APPLICATION

This application claims the benefit of priority to Japanese Patent Application No. 2010-161838, filed Jul. 16, 2010, of which full contents are incorporated herein by reference.

BACKGROUND OF THE INVENTION

1. Field of the Invention

The present invention relates to a motor drive circuit.

2. Description of the Related Art

There are cases where a motor is locked and is not driven to rotate even though a drive circuit is supplying a drive current to a drive coil. In this case, an overcurrent might flow through the drive coil thereby burning out the drive coil, or an overcurrent might flow through the drive circuit thereby causing the drive circuit to generate heat and break down.

As a protection circuit configured to stop supply of a drive current to the drive coil performed by the drive circuit if a motor is locked, (hereinafter referred to as a protective operation), known is a locking protection circuit as described in Japanese Patent Laid-Open Publication No. 2000-188893, for example.

The locking protection circuit used to stop supply of the drive current to the drive coil performed by the drive circuit if a rotation signal indicating rotation of the motor is not generated for a certain time period, although the drive current is being supplied to the drive coil.

For the purpose of suppressing vibration, noise or the like at the start of the motor, for example, the motor may be started slowly in some cases, setting a time period, from a time when power is turned on till a time when a power supply voltage reaches a steady voltage, at approximately several seconds.

In such a power supply, however, if the locking protection circuit described in Japanese Patent Laid-Open Publication No. 2000-188893 is employed, such a low power supply voltage period during which a drive current required for normal motor rotation cannot be generated results in a long period, in the time period from the time when power is turned on till the time when the power supply voltage reaches the steady voltage, so that a rotation signal indicating motor rotation is not generated in that time period, thereby causing a possibility of misjudgment that the motor is locked although the motor is not locked in actuality.

SUMMARY OF THE INVENTION

A motor drive circuit according to an aspect of the present invention, includes: a drive circuit configured to supply a drive current to a drive coil of a motor; a control circuit configured to control an operation of the drive circuit; a locking protection circuit configured to control an operation of the control circuit so that the drive circuit stops supplying the drive current to the drive coil, if a rotation signal, indicating rotation of the motor, is not generated during a predetermined time period although the drive circuit is supplying the drive current to the drive coil; and a prohibition circuit configured to prohibit the locking protection circuit from controlling the control circuit.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Entire Configuration of Motor Drive Circuit

Figure 1:
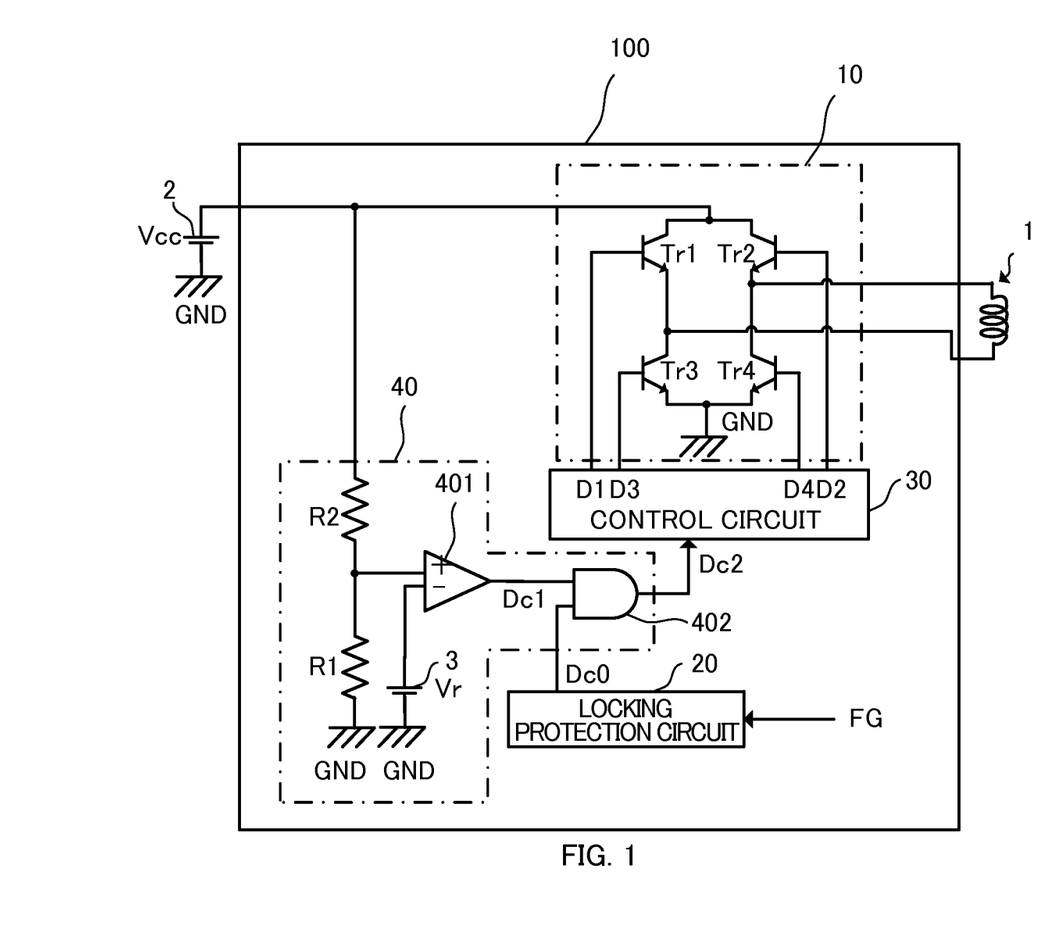
FIG. 1 is a diagram illustrating a motor drive circuit according to an embodiment of the present invention.

FIG. 1 is a diagram illustrating a motor drive circuit according to an embodiment of the present invention.

A motor drive circuit 100 is configured to drive a single-phase motor at a rotation speed which is in accordance with a power supply voltage Vcc, for example, and includes a drive circuit 10, a locking protection circuit 20, a control circuit 30, and a prohibition circuit 40.

The locking protection circuit 20, the control circuit 30, and a comparator 401 and an AND gate 402 in the prohibition circuit 40 are assumed to be operated by being applied with a power supply voltage (5 volts, for example) obtained by regulating the power supply voltage Vcc, for example.

The drive circuit 10 is configured to supply a drive current, which is in accordance with the power supply voltage Vcc, to a drive coil 1 of the single-phase motor in order to rotate the single-phase motor. The drive circuit 10 is an H-bridge circuit, for example, and this H-bridge circuit includes source transistors Tr1 and Tr2, and sink transistors Tr3 and Tr4. The power supply voltage Vcc is applied to collectors of the source transistors Tr1 and Tr2. Emitters of the sink transistors Tr3 and Tr4 are grounded. One end of the drive coil 1 is connected to a connection point between the source transistor Tr1 and the sink transistor Tr3. The other end of the drive coil 1 is connected to a connection point between the source transistor Tr2 and the sink transistor Tr4.

The control circuit 30 outputs control signals D1 to D4 to control on/off of the source transistors Tr1 and Tr2 and the sink transistors Tr3 and Tr4. If a drive current is supplied to the drive coil 1, the control circuit 30 outputs the control signals D1 to D4 to complementarily turn on/off a pair of the source transistor Tr1 and the sink transistor Tr4 and a pair of the source transistor Tr2 and the sink transistor Tr3. On the other hand, if the supply of the drive current to the drive coil 1 is stopped, the control circuit 30 outputs the control signals D1 to D4 to turn off the source transistors Tr1 and Tr2 and the sink transistors Tr3 and Tr4.

To the locking protection circuit 20, a rotation signal FG is inputted, which is obtained by binarizing a back electromotive voltage, generated by rotation of the motor, by a comparator (not shown) with 0 volts being as a reference, for example. The rotation signal FG has a period in accordance with the rotation speed of the motor. The locking protection circuit 20 outputs a control signal Dc0 to stop the supply of the drive current to the drive coil 1, in the case where the rotation signal FG is not inputted within a predetermined time T1. The locking protection circuit 20 will be described later in detail.

The prohibition circuit 40 prohibits the locking protection circuit 20 from outputting the control signal Dc0 to stop the supply of the drive current to the control circuit 30, in the case where the voltage according to the power supply voltage Vcc is lower than a reference voltage Vr. The prohibition circuit 40 will be described later in detail.

Locking Protection Circuit

Figure 2:
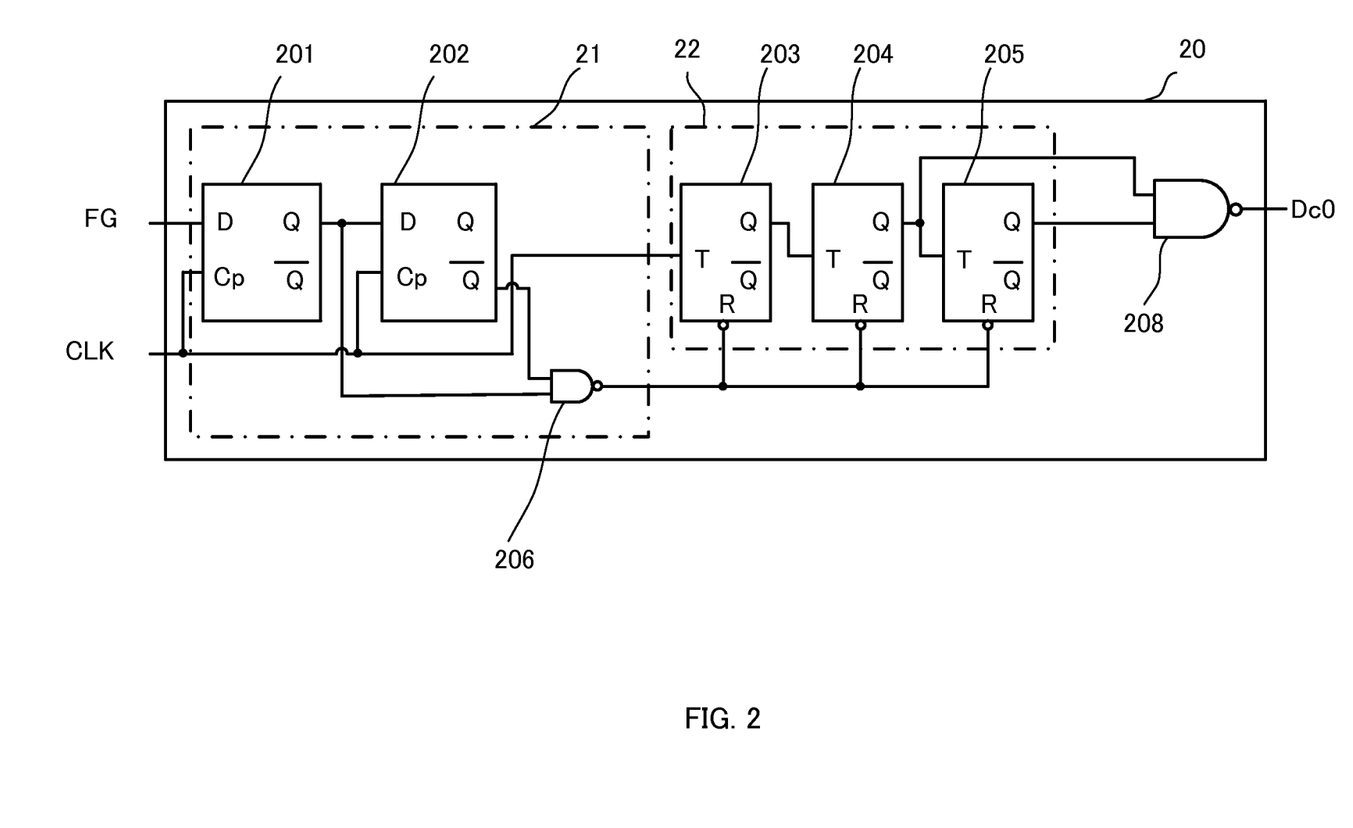
FIG. 2 is a circuit diagram illustrating a locking protection circuit according to an embodiment of the present invention.

FIG. 2 is a circuit diagram illustrating a locking protection circuit according to an embodiment of the present invention.

The rotation signal FG and a clock CLK is inputted to the locking protection circuit 20, and the control signal Dc0 is outputted therefrom. The locking protection circuit 20 outputs the control signal Dc0 to stop the supply of the drive current to the drive coil 1, in the case where the rotation signal FG is not inputted thereto within the predetermined time T1.

The locking protection circuit 20 includes a reset circuit 21, a counter circuit 22, and a NAND gate 208.

The locking protection circuit 20 operates in synchronization with a rising edge of the clock CLK, for example.

The rotation signal FG and the clock CLK are inputted to the reset circuit 21. The reset circuit 21 outputs a reset signal whose logic level is low, for example, when detecting the rising edge of the rotation signal FG at which the rotation signal FG rises in logic level from low to high.

The reset circuit 21 includes D-type flip-flops (hereinafter each referred to as DFF) 201 and 202, and a NAND gate 206.

The DFF 201 and the DFF 202 are cascade-connected. In the reset circuit 21, the DFFs 201 and 202 are provided in order to detect a rise in logic level from a low level to a high level in the rotation signal FG. An output terminal of the DFF 201 is connected to one input terminal of the NAND gate 206. An inverting output terminal of the DFF 202 is connected to the other input terminal of the NAND gate 206.

In the DFF 201, a low level is maintained on a rising edge of the clock CLK (hereinafter referred to as a first clock edge) and a high level is maintained on a rising edge (hereinafter referred to as a second clock edge) of the clock CLK immediately thereafter, thereby detecting a rising edge of the rotation signal FG. In the DFF 202, since the low-level signal maintained by the DFF 201 on the first clock edge is maintained on the second clock edge, an inverting output of the DFF 202 is maintained at a high level. Thus, since the signals whose logic levels are high are inputted to both of the input terminals of the NAND gate 206, a signal whose logic level is low is outputted from an output terminal of the NAND gate 206. Therefore, if the rising edge of the rotation signal FG is inputted to the reset circuit 21, a reset signal whose logic level is low, for example, is outputted from the reset circuit 21.

The counter circuit 22 is a 3-bit down counter, for example, and is reset if the reset signal outputted from the reset circuit 21 is inputted.

The counter circuit 22 includes T-type flip-flops (hereinafter each referred to as TFF) 203 to 205.

Each of the TFFs 203 to 205 is a flip-flop which operates on a rising edge, for example, and they are cascade-connected. Reset terminals of the TFFs 203 to 205 are connected to the output terminal of the NAND gate 206.

If the rotation signal FG is inputted to the reset circuit 21, the reset circuit 21 outputs the reset signal, thereby resetting the counter circuit 22. If the rotation signal FG is not inputted to the reset circuit 21, the counter circuit 22 repeats 3-bit down-count.

One input terminal of the NAND gate 208 is connected to an output terminal of the second-stage TFF 204, and the other input terminal of the NAND gate 208 is connected to an output terminal of the third-stage TFF 205.

Only in the case where a signal whose logic level is high is inputted to both of the input terminals of the NAND gate 208, the control signal Dc0 whose logic level is low is outputted from the output terminal of the NAND gate 208. On the other hand, except in the case where a signal whose logic level is high is inputted to both of the input terminals of the NAND gate 208, the control signal Dc0 whose logic level is high is outputted from the output terminal of the NAND gate 208.

Figure 3:
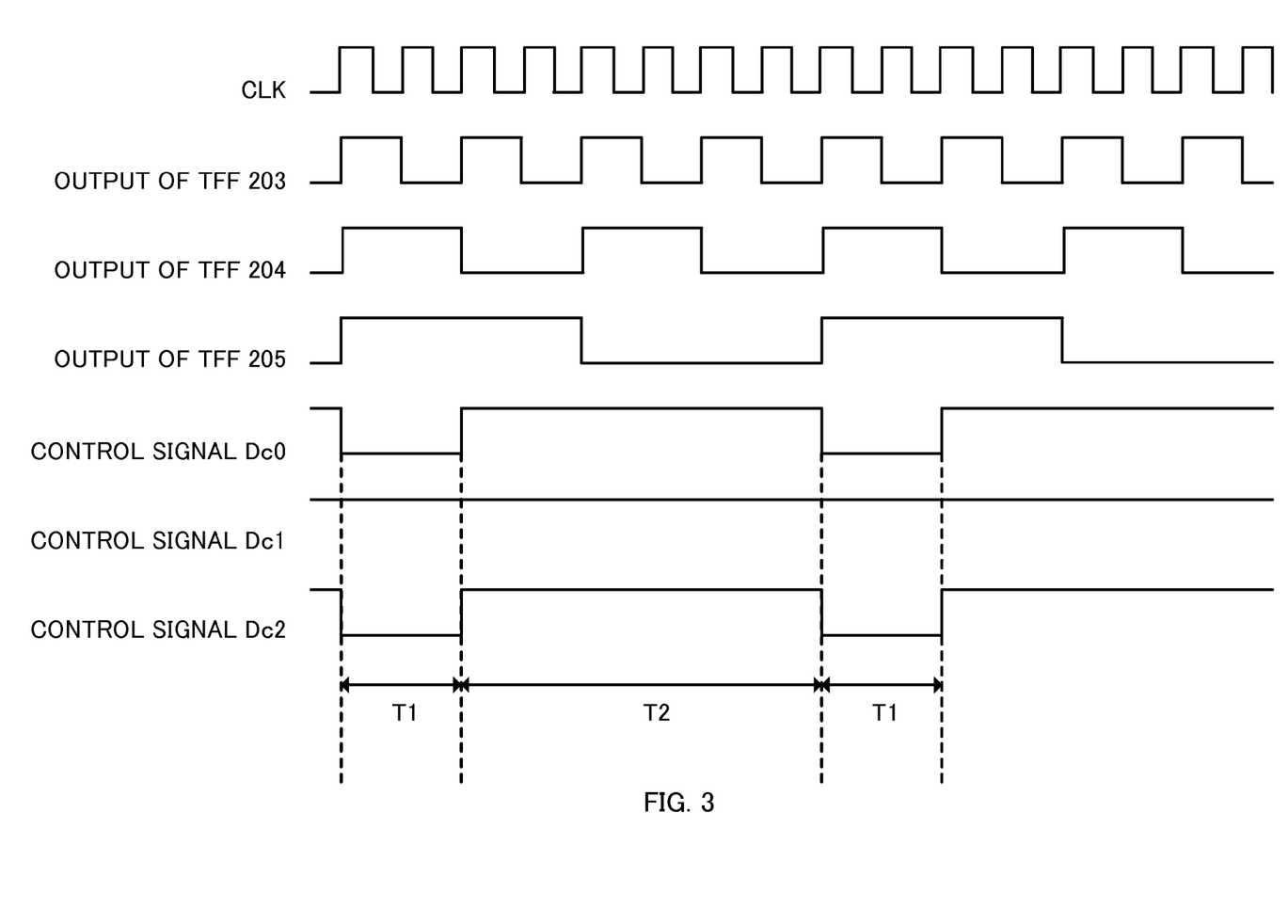
FIG. 3 is a waveform diagram illustrating signals of a motor drive circuit according to an embodiment of the present invention.
Figure 4:
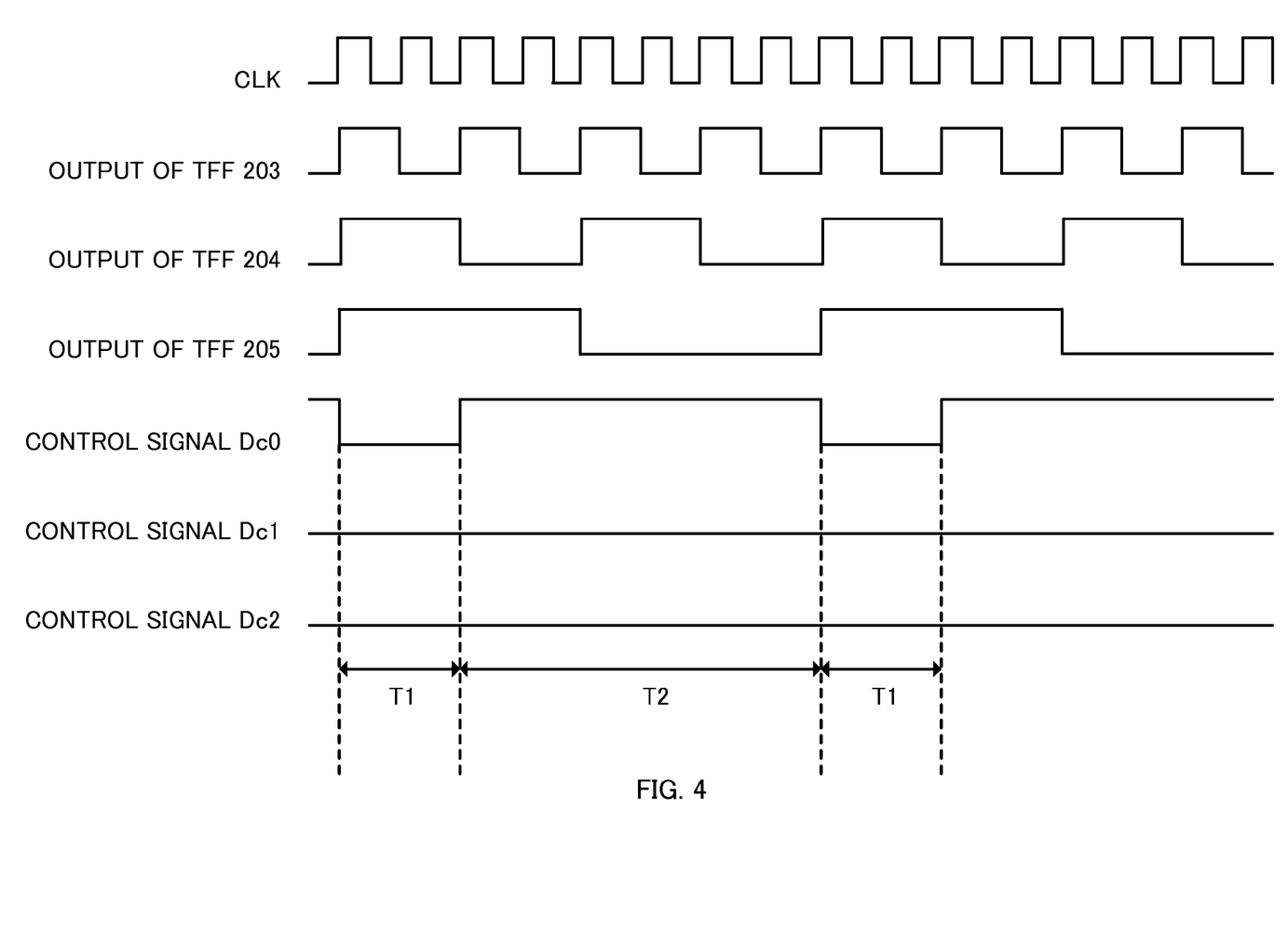
FIG. 4 is a waveform diagram illustrating signals of a motor drive circuit according to an embodiment of the present invention.
Figure 5:
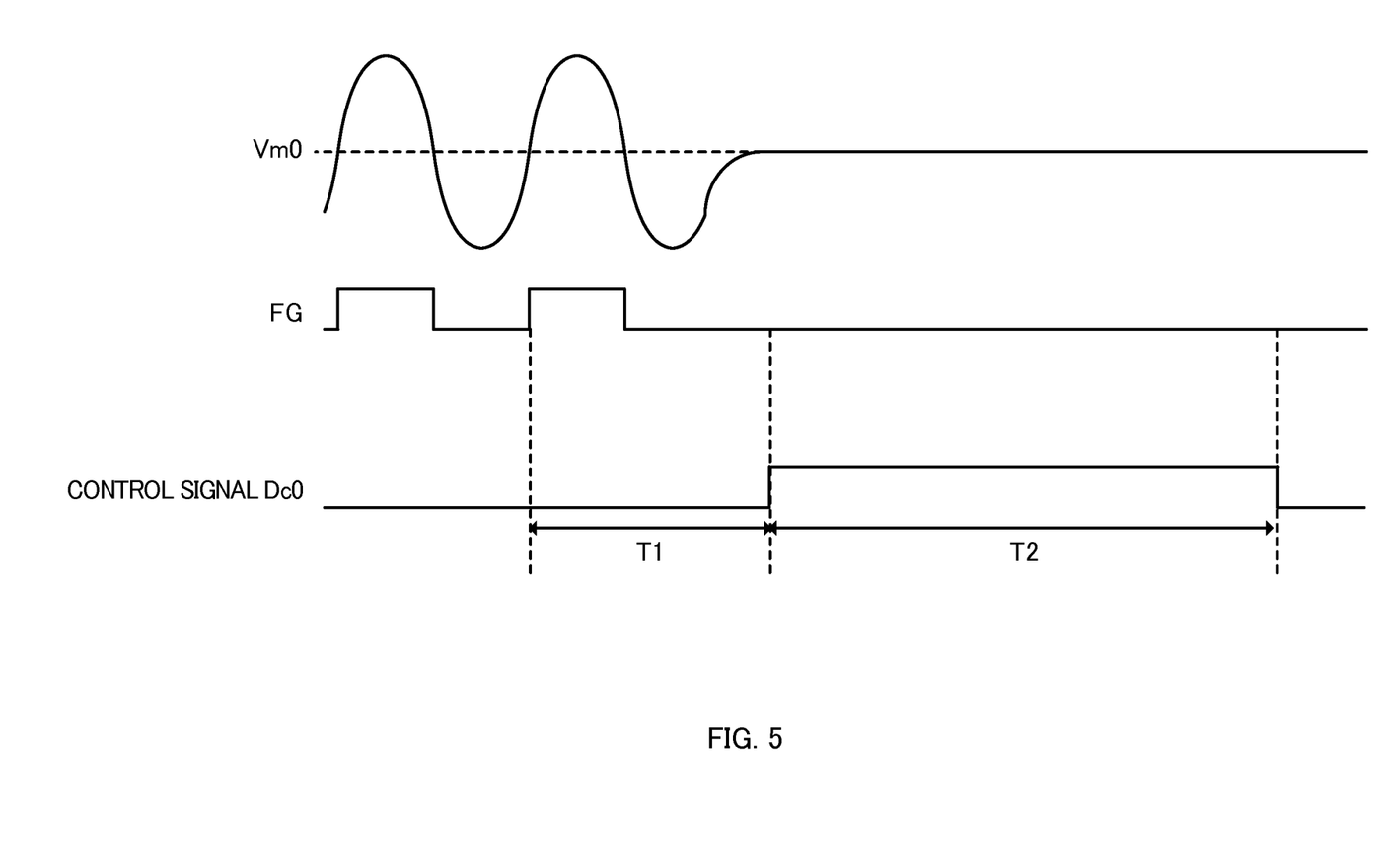
FIG. 5 is a waveform diagram illustrating signals of a locking protection circuit according to an embodiment of the present invention.

FIG. 3 is a waveform diagram illustrating signals of the motor drive circuit according to an embodiment of the present invention. FIG. 4 is a waveform diagram illustrating signals of the motor drive circuit according to an embodiment of the present invention. FIG. 5 is a waveform diagram illustrating signals of the locking protection circuit according to an embodiment of the present invention.

An operation of the locking protection circuit 20 will be described referring to FIGS. 3, 4, and 5. As described above, the rotation signal FG is a signal obtained by binarizing a back electromotive voltage Vm0, which is generated by rotation of the motor, for example, by a comparator with 0 volts being as a reference, for example.

During the predetermined time T1 from a time when the counter circuit 22 starts counting, the NAND gate 208 outputs the control signal Dc0 whose logic level is low. Thereafter, the NAND gate 208 outputs the control signal Dc0 whose logic level is high during a predetermined time T2.

During the predetermined time T1 from the time when the counter circuit 22 starts counting, the locking protection circuit 20 outputs the control signal Dc0 whose logic level is low. Then, if the rotation signal FG (hereinafter referred to as a first rotation signal FG) is inputted to the locking protection circuit 20 during the predetermined time T1 from the time when the counter circuit 22 starts counting, the locking protection circuit 20 continues to output the control signal Dc0 whose logic level is low during the predetermined time T1 after the time when the first rotation signal FG is inputted. Therefore, if the period of the rotation signal FG is shorter than the predetermined time T1, the locking protection circuit 20 outputs the control signal Dc0 whose logic level is low. That is, if the rotation signal FG is inputted within the predetermined time T1, the locking protection circuit 20 continues to output the control signal Dc0 whose logic level is low.

On the other hand, if the rotation signal FG is not inputted to the locking protection circuit 20 during the predetermined time T1 from the time when the counter circuit 22 starts counting, the locking protection circuit 20 outputs the control signal Dc0, whose logic level is high, after the predetermined time T1 has elapsed.

Prohibition Circuit

The prohibition circuit 40 prohibits the locking protection circuit 20 from outputting the control signal Dc0 to stop the supply of the drive current to the control circuit 30, if the voltage according to the power supply voltage Vcc is lower than the reference voltage Vr. The prohibition circuit 40 outputs a control signal Dc2 on the basis of a comparison result obtained by comparing the voltage according to the power supply voltage Vcc with the reference voltage.

The prohibition circuit 40 includes a serial resistor made up of resistors R1 and R2, a reference power supply 3, a comparator 401, and an AND gate 402.

One end of the resistor R2 is connected to a power supply 2, one end of the resistor R1 is grounded, and a connection point between the resistors R1 and R2 is connected to a non-inverting input terminal of the comparator 401. An inverting input terminal of the comparator 401 is grounded through the reference power supply 3. An output terminal of the comparator 401 is connected to one input terminal of the AND gate 402. The other input terminal of the AND gate 402 is connected to an output terminal of the locking protection circuit 20. The control signal Dc2 outputted from the AND gate 402 is supplied to the control circuit 30.

A resistance value of the resistor R1 is set so that impedance of the resistor R1 is smaller than input impedance of the non-inverting input terminal of the comparator 401. A resistance value of the resistor R2 is set at three times, for example, the resistance value of the resistor R1 so that the voltage to be applied to the resistor R2 becomes three times, for example, the voltage to be applied to the resistor R1. The reference voltage Vr is set so as to have the same voltage value as the voltage to be applied to the resistor R1 by dividing, using the resistors R1 and R2, the power supply voltage Vcc with which the single-phase motor starts driving. The comparator 401 compares the voltage applied to the resistor R1, which is applied to the non-inverting input terminal, with the reference voltage Vr, which is inputted to the inverting input terminal, and outputs a control signal Dc1 indicating the comparison result. The comparator 401 outputs the control signal Dc1 whose logic level is high, if the voltage applied to the resistor R1 is higher than the reference voltage Vr. On the other hand, if the voltage applied to the resistor R1 is lower than the reference voltage Vr, the comparator 401 outputs the control signal Dc1 whose logic level is low. The control signals Dc0 and Dc1 are inputted to the AND gate 402, and the control signal Dc2 is outputted from the AND gate 402.

Here, an operation of the prohibition circuit 40 will be described referring to FIGS. 3 and 4.

For example, if the voltage applied to the resistor R1 is lower than the reference voltage Vr, the control signal Dc1 goes low in logic level. Since the control signals Dc1 and Dc0 are inputted to the AND gate 402, the control signal Dc2 outputted from the AND gate 402 goes low in logic level.

On the other hand, for example, if the voltage applied to the resistor R1 is higher than the reference voltage Vr, the control signal Dc1 goes high in logic level. Since the control signals Dc1 and Dc0 are inputted to the AND gate 402, the control signal Dc2 outputted from the AND gate 402 becomes the same in logic level as the control signal Dc0.

Operation of Motor Drive Circuit

An operation of the motor drive circuit 100 will be described referring to FIGS. 3, 4, and 6.

Figure 6:
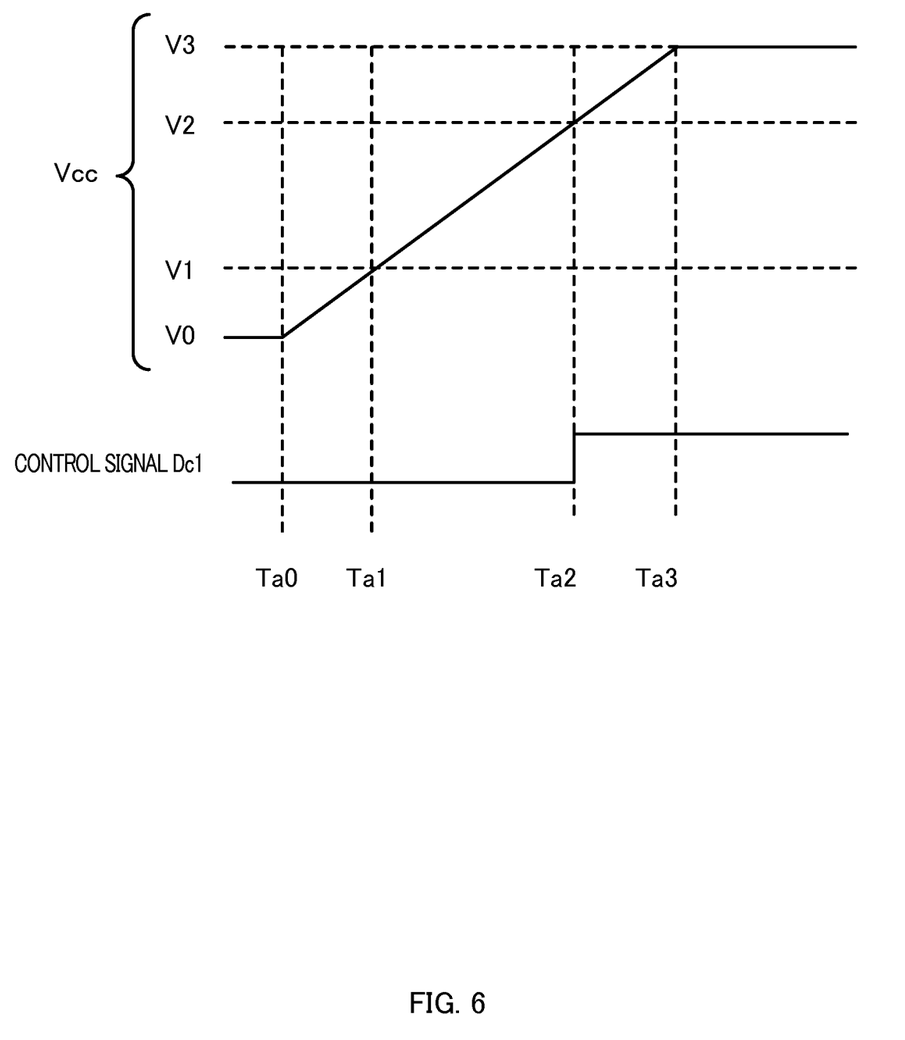
FIG. 6 is a waveform diagram illustrating start of a power supply according to an embodiment of the present invention.

FIG. 6 is a waveform diagram illustrating start of the power supply employed in an embodiment of the present invention.

The control circuit 30 is assumed to output control signals D1 to D4 to complementarily turn on/off the pair of the source transistor Tr1 and the sink transistor Tr4 and the pair of the source transistor Tr2 and the sink transistor Tr3, in the case where the control signal Dc2 whose logic level is low, for example, is inputted thereto. Further, the control circuit 30 is assumed to output control signals D1 to D4 to turn off the source transistors Tr1 and Tr2 and the sink transistors Tr3 and Tr4, in the case where the control signal Dc2 whose logic level is high, for example, is inputted thereto.

A voltage value V0 is assumed to be 0 volts. A voltage value V1 is assumed to be such a voltage value of the power supply voltage Vcc that each of the locking protection circuit 20, the control circuit 30, and the comparator 401 and the AND gate 402 in the prohibition circuit 40 starts operation with the power supply voltage (5 volts, for example) obtained by regulating the power supply voltage Vcc, for example. A voltage value V2 is assumed to be such a voltage value that the rotation of the single-phase motor starts and to be the voltage value of the power supply voltage Vcc corresponding to the reference voltage Vr of the comparator 401 of the prohibition circuit 40. A voltage value V3 is assumed to be such a voltage value of the power supply voltage Vcc that the motor performs a steady operation.

<From Time Ta0 to Time Ta1>

First, a description will be given of a time (time Ta0) when the power supply voltage Vcc is applied to the motor drive circuit 100.

Since the power supply voltage Vcc has not reached the voltage value V1, the locking protection circuit 20, the control circuit 30, and the comparator 401 and the AND gate 402 of the prohibition circuit 40 have not started operations yet.

<From Time Ta1 to Time Ta2>

The power supply voltage Vcc reaches the voltage value V1 at the time Ta1, and the power supply voltage (5 volts, for example) obtained by regulating the power supply voltage Vcc, for example, is applied to each of the locking protection circuit 20, the control circuit 30, and the comparator 401 and the AND gate 402 of the prohibition circuit 40, thereby starting operations thereof. The counter circuit 22 of the locking protection circuit 20 starts counting. Since the power supply voltage Vcc is lower than the voltage value V2 and the single-phase motor has not rotated yet, the rotation signal FG is not inputted to the locking protection circuit 20. Since the power supply voltage Vcc is lower than the voltage value V2 corresponding to the reference voltage Vr, the control signal Dc1 goes low in logic level, and the prohibition circuit 40 outputs the control signal Dc2 whose logic level is low. The control circuit 30 outputs the control signals D1 to D4 to complementarily turn on/off the pair of the source transistor Tr1 and the sink transistor Tr4 and the pair of the source transistor Tr2 and the sink transistor Tr3. The drive current corresponding to the drive voltage Vcc is supplied to the drive coil 1.

<From Time Tat and Thereafter>

The power supply voltage Vcc rises up to the voltage value V2 or more, the single-phase motor rotates, and the rotation signal FG is inputted to the locking protection circuit 20. Since the power supply voltage Vcc is higher than the voltage value V2 corresponding to the reference voltage Vr, the control signal Dc1 goes high in logic level, and the control signal Dc2 outputted from the prohibition circuit 40 becomes the same in logic level as the control signal Dc0 outputted from the locking protection circuit 20.

For example, if the period of the rotation signal FG is shorter than the predetermined time T1, the locking protection circuit 20 continues to output the control signal Dc0 whose logic level is low. The control signal Dc2 whose logic level is low continues to be inputted to the control circuit 30. Thus, the control circuit 30 outputs the control signals D1 to D4 to complementarily turn on/off the pair of the source transistor Tr1 and the sink transistor Tr4 and the pair of the source transistor Tr2 and the sink transistor Tr3. The drive current corresponding to the drive voltage Vcc is supplied to the drive coil 1.

On the other hand, if the period of the rotation signal FG is longer than the predetermined time T1, for example, the locking protection circuit 20 outputs the control signal Dc), whose logic level is high, after the predetermined time T1 has elapsed. Then, the control signal Dc2 whose logic level is high is inputted to the control circuit 30. The control circuit 30 outputs the control signals D1 to D4 to turn off the source transistors Tr1 and T2 and the sink transistors Tr3 and Tr4, if the control signal Dc2 whose logic level is high is inputted thereto. The drive current stops being supplied to the driving coil 1.

As described above, if the power supply voltage Vcc applied to the drive circuit 10 is lower than a predetermined voltage, the prohibition circuit 40 prohibits the locking protection circuit 20 from outputting the control signal Dc0 to stop supplying the drive current to the control circuit 30. Thus, prevented is such a malfunction of the locking protection circuit 20 that the drive current is stopped being supplied to the drive coil 1 considering that the motor is locked although in actuality the motor is not locked, in the case where the predetermined time T1 or more is required for the power supply voltage Vcc to reach the predetermined voltage after power is turned on. Therefore, in the case where the power supply voltage Vcc applied to the drive circuit 10 is lower than the predetermined voltage, the drive current can be supplied to the drive coil 1 regardless of the operation of the locking protection circuit 20.

Further, the prohibition circuit 40 includes the comparator 401 and the AND gate 402. The comparator 401 compares the power supply voltage Vcc with the reference voltage Vr, and outputs the comparison result. The control signal Dc1 outputted from the comparator 401 and the control signal Dc0 outputted from the locking protection circuit 20 are inputted to the AND gate 402, and the AND gate 402 outputs the control signal Dc2. Thus, with a simple configuration using the comparator 401 and the AND gate 402, the power supply voltage Vcc is compared with the reference voltage Vr, and the control signal Dc2 is outputted, thereby providing the motor drive circuit 100 with a low cost.

Further, the prohibition circuit 40 includes the resistors R1 and R2. The comparator 401 compares the power supply voltage Vcc, which is divided by the resistors R1 and R2 and applied to the resistor R1, with the reference voltage Vr. Therefore, a voltage in accordance with a rated voltage of the comparator 401 can be applied to the comparator 401. Thus, the general-purpose comparator 401 can be used, thereby providing the motor drive circuit 100 with a low cost.

The above embodiments of the present invention are simply for facilitating the understanding of the present invention and are not in any way to be construed as limiting the present invention. The present invention may variously be changed or altered without departing from its spirit and encompass equivalents thereof.

In an embodiment of the present invention, the non-inverting input terminal of the comparator 401 is connected to the connection point between the resistors R1 and R2, the inverting input terminal of the comparator 401 is grounded through the power supply 3, and the prohibition circuit 40 compares the voltage corresponding to the power supply voltage Vcc with the reference voltage Vr, but not limited to that. For example, the prohibition circuit 40 may be configured to compare the power supply voltage Vcc with a reference voltage Vra, i.e., the power supply voltage Vcc with which the single-phase motor starts driving. In this case, the prohibition circuit 40 prohibits the locking protection circuit 20 from outputting the control signal Dc0 to stop supplying the drive current to the control circuit 30, if the power supply voltage Vcc is lower than the reference voltage Vra. It is assumed that the prohibition circuit 40 is provided with a reference power supply (not shown) configured to output the reference voltage Vra. It is also assumed that the non-inverting input terminal of the comparator 401 is grounded through the power supply 2, and the inverting input terminal of the comparator 401 is grounded through the reference power supply. Further, in an embodiment of the present invention, the prohibition circuit 40 is configured such that the control signal Dc1 is outputted from the output terminal of the comparator 401 and inputted to one input terminal of the AND gate 402, but not limited to that. For example, in the case where the motor drive circuit 100 is configured with an IC, the prohibition circuit 40 may be configured such that the control signal Dc1 inputted to one input terminal of the AND gate 402 is inputted from a microcomputer (not shown), for example, which is provided outside the motor drive circuit 100. In this case, the motor drive circuit 100 is assumed to be provided with a terminal (not shown) for inputting the control signal Dc1 outputted by the microcomputer, which is provided outside the motor drive circuit 100, to one input terminal of the AND gate 402. Further, in an embodiment of the present invention, the prohibition circuit 40 compares the voltage corresponding to the power supply voltage Vcc with the reference voltage Vr, and prohibits the locking protection circuit 20 from outputting the control signal Dc0, to stop the supply of the drive current, to the control circuit 30, but not limited to that. For example, the prohibition circuit 40 may be configured so as to prohibit the locking protection circuit 20 from outputting the control signal Dc0, to stop the supply of the drive current, to the control circuit 30 during a predetermined time Tx from a start of application of the power supply voltage Vcc, regardless of the value of the power supply voltage Vcc. For example, the prohibition circuit 40 may be configured so as to prohibit the output of the control signal Dc0, to stop the supply of the drive current, to the control circuit 30 for the predetermined time Tx after the power supply voltage Vcc has reached the voltage V1 in FIG. 6, for example, regardless of the value of the power supply voltage Vcc. It should be noted that the voltage V1 is a voltage at which the operation of the locking protection circuit 20 is started. In this case, a microcomputer (not shown), for example, is assumed to be provided in the prohibition circuit 40. The microcomputer is assumed to output the low-level control signal Dc1, for example, for the predetermined time Tx after the power supply voltage Vcc has reached the voltage V1 in FIG. 6, for example. One input terminal of the AND gate 402 is assumed to be connected to the microcomputer so that the control signal Dc1 is inputted from the microcomputer, for example.

What is claimed is:

1. A motor drive circuit comprising:
   a control circuit configured to control a drive current to a drive coil of a motor;
   a locking protection circuit configured to control an operation of the control circuit so that the drive current is in response to a rotation signal not being generated for a predetermined time period although the drive current is being supplied to the drive coil; and
   a prohibition circuit configured to prohibit the locking protection circuit from controlling the control circuit in response to the rotation signal not being generated for the predetermined time period, wherein the prohibition circuit prohibits the locking protection circuit from controlling the control circuit during a time period during which a power supply voltage is lower than a predetermined voltage, and wherein the prohibition circuit includes:
   a comparison circuit configured to compare a voltage according to the power supply with a reference voltage; and
   a gate circuit configured to prohibit the locking protection circuit from controlling the control circuit in accordance with an output of the comparison circuit, in a case where the voltage according to the power supply voltage is lower than the reference voltage.

2. The motor drive circuit according to claim 1, wherein the prohibition circuit prohibits the locking protection circuit from controlling the control circuit during a time period during which a power supply voltage is lower than a predetermined voltage.

3. The motor drive circuit according to claim 1, wherein the voltage according to the power supply voltage is a voltage obtained by dividing the power supply voltage by a voltage-dividing resistor.

4. The motor drive circuit of according to claim 1, further including a drive circuit configured to supply the drive current to a drive coil of a motor.

5. A method for controlling a motor comprising generating a drive circuit control signal to control a drive circuit for the motor in response to a locking protection signal from a locking protection circuit, wherein the locking protection signal is in response to a rotation signal not being generated for a predetermined time period although a drive current is being supplied to the drive coil, and wherein the locking protection signal is prohibited from controlling the drive circuit control signal during a time period during which a power supply voltage applied to the drive circuit is less than a reference voltage in response to a prohibition signal from a prohibition circuit, wherein the prohibition circuit includes:
   a comparison circuit configured to compare a voltage according to the power supply with a reference voltage; and
   a gate circuit configured to prohibit the locking protection circuit from controlling the control circuit in accordance with an output of the comparison circuit, in a case where the voltage according to the power supply voltage is lower than the reference voltage.

6. The method of claim 5, wherein generating the motor control signal comprises:
   generating a shifted power supply voltage; and
   generating a comparison signal in response to comparing the shifted power supply voltage with the reference voltage.

7. The method of claim 6, wherein generating the shifted power supply voltage comprises reducing the power supply voltage signal.

8. The method of claim 6, further including generating the locking protection signal in response to a level of a drive current for the motor.

9. The method of claim 8, further including generating the locking protection signal in response to the level of the drive current being zero.

10. The method of claim 8, further including generating the locking protection signal in response to a back electromotive voltage.

11. The method of claim 10, further including generating the rotation signal in response to a rotation of the motor being stopped for a predetermined time; and using the rotation signal and the comparison signal to generate the drive control signal.

12. The method of claim 11, wherein generating the rotation signal includes using the back electromotive voltage generated by the motor.

13. The method of claim 6, further including generating a locking protection signal in response to a period of a rotation signal being longer than a predetermined time.

14. The method of claim 13, further including using the comparison signal and the locking protection signal to generate the drive circuit control signal.

15. A method for controlling a motor, comprising:
   generating a rotation signal;
   generating a power supply level indicator signal in response to a voltage level of a power supply; and
   using the rotation signal and the power supply indicator signal to generate a control signal to control the motor and further including using the control signal to prohibit a locking protection circuit from controlling a control circuit, wherein the control signal to prohibit the locking protection circuit is generated from a prohibition circuit that includes:
   a comparison circuit configured to compare a voltage according to the power supply with a reference voltage; and
   a gate circuit configured to prohibit the locking protection circuit from controlling the control circuit in accordance with an output of the comparison circuit, in a case where the voltage according to the power supply voltage is lower than the reference voltage.

16. The method of claim 15, further including binarizing a back electromotive voltage and generating the rotation signal in response to the binarized back electromotive voltage.

17. The method of claim 15, wherein generating the power supply indicator signal comprises:
   generating a shifted power supply voltage by voltage shifting the voltage level of the power supply; and
   comparing the shifted power supply voltage with a reference voltage.

18. The method of claim 17, wherein using the control signal to prohibit the locking protection circuit from controlling the control circuit includes prohibiting the locking protection circuit from outputting the control signal to stop a drive current to the control circuit.

* * * * *